United States Patent [19]

Bissegger

[11] Patent Number: 4,792,679
[45] Date of Patent: Dec. 20, 1988

[54] APPARATUS FOR INCREMENTAL LENGTH MEASUREMENT HAVING AN INCLINED SLOT OVER THE LIGHT SOURCE

[75] Inventor: Marcel Bissegger, Safnern, Switzerland

[73] Assignee: Saphirwerk Industrie Produkte, Bruegg, Switzerland

[21] Appl. No.: 9,756

[22] Filed: Feb. 2, 1987

[30] Foreign Application Priority Data

Feb. 7, 1986 [CH] Switzerland ............... 500/86

[51] Int. Cl.⁴ ............................................. G01D 5/36
[52] U.S. Cl. ........................ 250/237 G; 250/231 SE
[58] Field of Search ............ 250/237 G, 231 SE; 340/347 P; 356/395

[56] References Cited

U.S. PATENT DOCUMENTS

| | | | |
|---|---|---|---|
| 3,586,665 | 6/1971 | Weyrauch | 356/395 |
| 4,384,204 | 5/1983 | Tamaki et al. | 250/237 G |
| 4,647,769 | 3/1987 | Stone et al. | 250/231 SE |
| 4,673,810 | 6/1987 | Babsch et al. | 250/237 G |

FOREIGN PATENT DOCUMENTS 2086036  5/1982  United Kingdom .

Primary Examiner—David C. Nelms
Assistant Examiner—Stephone B. Allen
Attorney, Agent, or Firm—Wood, Dalton, Phillips, Mason & Rowe

[57] ABSTRACT

A light source throws a light beam through a transparent scale provided with graduation lines. The light beam is focussed by means of an aperture in such a way that it is disposed at an inclined angle with respect to the graduation lines. Upon relative displacement as between the scale and the aperture, that arrangement provides that a constantly changing light beam is projected onto a photosensitive receiving means. Depending on the respective position and configuration of the light beam on the receiving means, it is possible to arrive at the relative position of the scale within a travel increment.

9 Claims, 4 Drawing Sheets

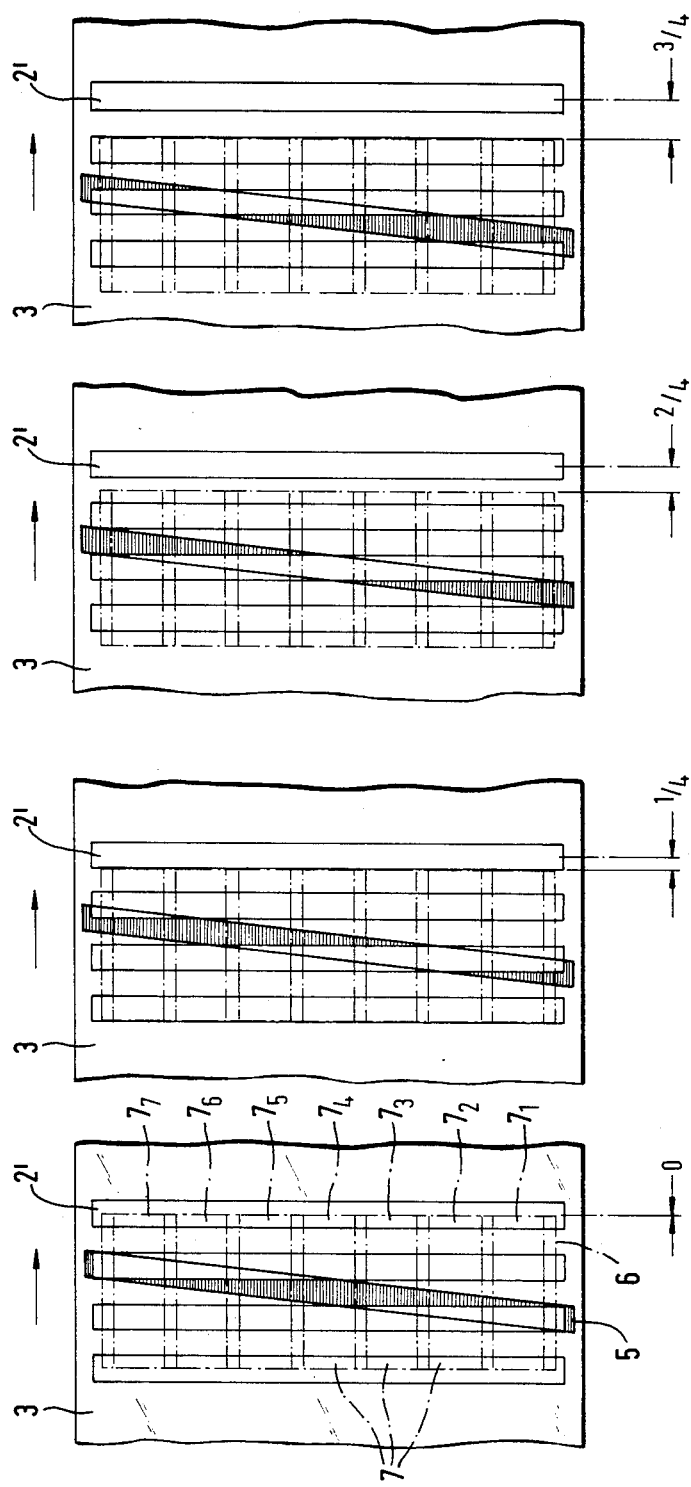

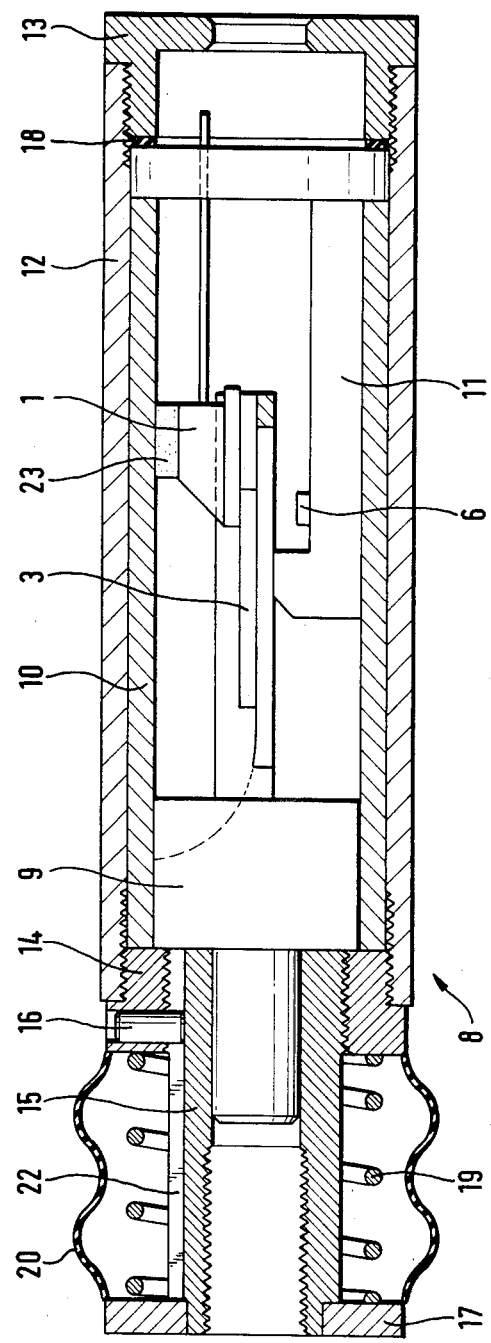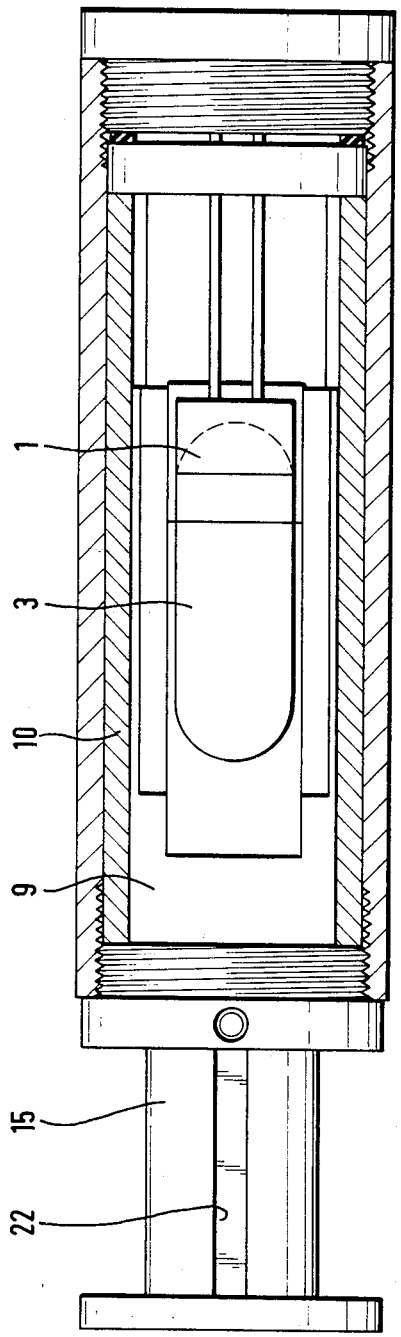

APPARATUS FOR INCREMENTAL LENGTH MEASUREMENT HAVING AN INCLINED SLOT OVER THE LIGHT SOURCE

FIELD OF THE INVENTION

The invention relates to an apparatus for incremental length measurement comprising a light source for passing light through a transparent scale provided with regular graduation lines, an aperture for producing a focussed light beam, in particular a light bar, and a photosensitive receiving means for receiving the light beam in at least one relative position between the aperture and the scale. Optical measuring systems of that kind can achieve a high degree of resolution in the measuring section and thus a high degree of measuring accuracy. The light-dark signals which are produced by means of the scale and the aperture are recorded by the photo-sensitive receiving means, and counted out.

DESCRIPTION OF THE PRIOR ART

The length of a travel increment in the aforesaid apparatus is determined by the width of a graduation line. As the minimum width of a graduation line is limited for reasons relating to the manufacturing procedure, it is also necessary to be able to define intermediate values within an increment. In known measuring systems, that is done by interpolation in that the system includes at least one second receiving means which is arranged in a displaced position with respect to the first receiving means and which receives light-dark signals from an aperture which is also arranged in a displaced position. A travel increment can be further subdivided by means of the two signals produced in that way.

SUMMARY OF THE INVENTION

Therefore, an object of the present invention is to provide an apparatus of the kind set forth in the opening part of this specification, which is of a simple construction and which is as insensitive as possible to interference phenomena. The invention further seeks to provide that the appartus can be disposed in a space-saving manner and that the apparatus has a high resolution capability.

According to the invention, that object is achieved with an apparatus in which the aperture is arranged in an angularly displaced relationship, in regard to its longitudinal extent, with respect to the graduation lines of the scale, and in which, upon a relative movement as between the scale and the aperture a light beam which is displaceable in the longitudinal direction of the graduation lines can be projected on the receiving means.

It will be seen that the inclined arrangement of the light bar relative to the individual graduation lines means that a light beam can be projected on to the receiving means, the cross-sectional configuration of the light beam varying in the course of a travel increment in the longitudinal direction of a graduation line. That means that the entire length of a graduation line is available for resolution of an increment. There is no need for an optical-electrical signal forming means for interpolation purposes as any relative position of the light beam projected on to the receiving means may be easily associated with a given fraction of a travel increment. In particular fluctuations in the level of intensity of the light source do not have any effect as it is only the relative position of a light beam and not the level of intensity thereof that is significant in regard to the measurement operation. Electromagnetic waves or partial clouding of the scale due to fouling also do not have any effect on the measurement result.

In a particularly advantageous construction, the aperture is arranged between the light source and the scale. If the aperture is disposed directly on a light emitting diode, that provides a particularly compact and space-saving construction.

The relative position of the light beam on the receiving means may be detected in a particularly advantageous manner if the receiving means has a plurality of receiving units, in the longitudinal direction of the graduation lines, which receiving units can be activated alternatively for signal formation purposes, depending on the respective relative position as between the scale and the aperture. Thus for example a plurality of photodiodes may be arranged on above the other on a photodiode array. It will be seen that the level of resolution of an increment is increased in proportion to an increasing number of independently activatable receiving units along the length of a graduation line in the receiving means.

BRIEF DESCRIPTION OF THE DRAWINGS

In order that the invention may be clearly understood and readily carried into effect apparatus in accordance therewith will now be described, by way of example with reference to the accompanying drawings, in which:

FIG. 4a to 4c show the variation in a light beam as received on a receiving means in four sequential operative conditions of the apparatus;

FIG. 5 is a view in cross-section through the measuring sensor of a measuring machine having an apparatus incorporating the invention; and FIG. 6 is a partly sectional plan view of the measuring sensor shown in FIG. 5.

DESCRIPTION OF PREFERRED EMBODIMENT

Figure 1:
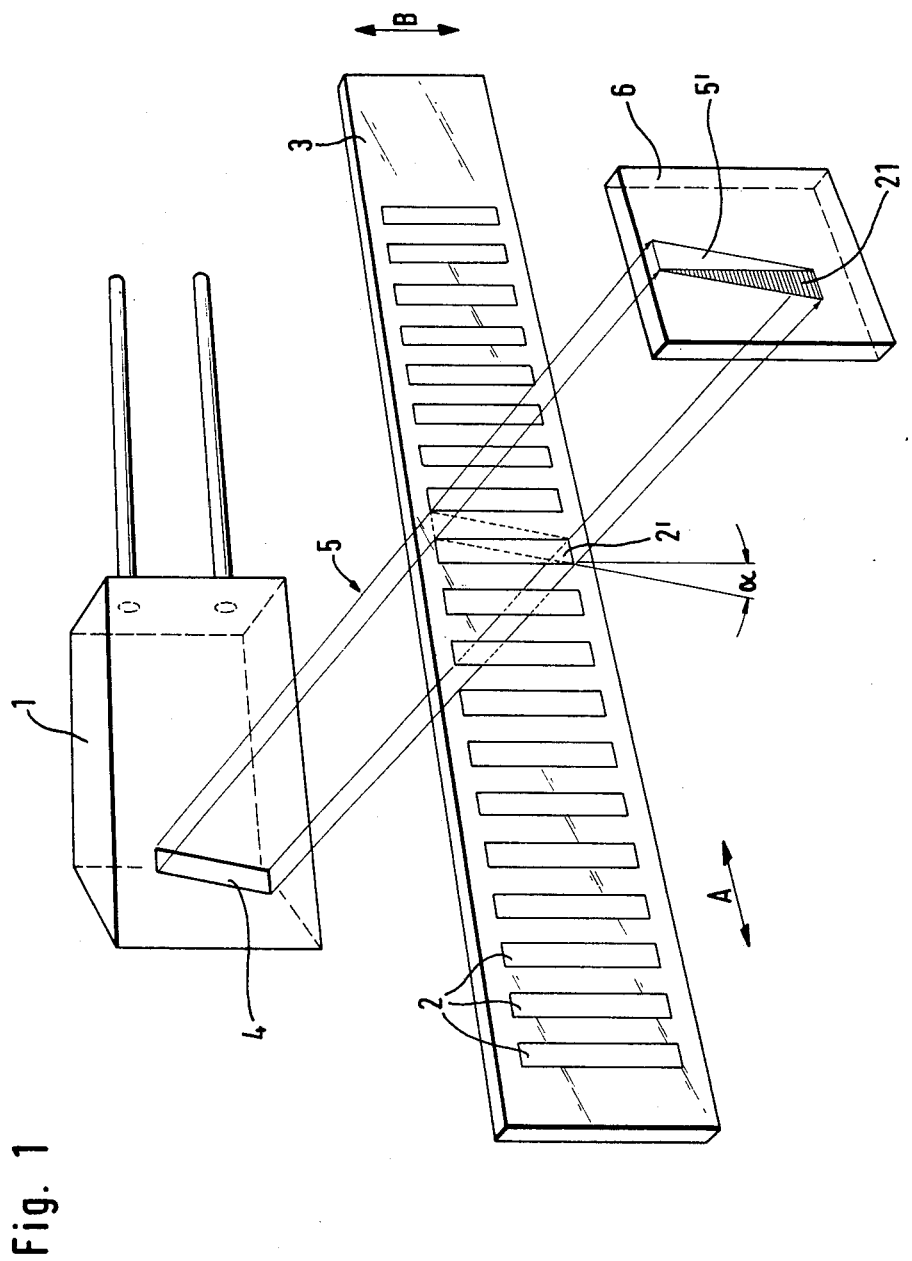
FIG. 1 is a perspective view of a measuring arrangement.
Figure 2:
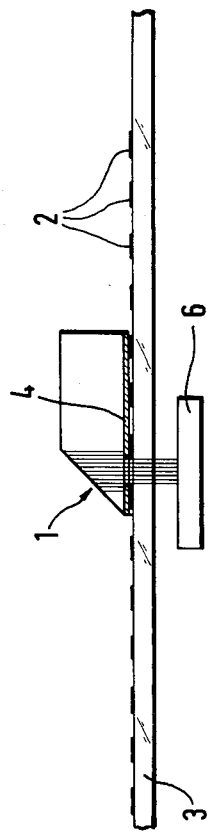
FIG. 2 is a view of the measuring arrangement of FIG. 1 from above.

As shown in FIG. 1, the apparatus essentially comprises a light source 1 and, arranged in front thereof, a line aperture 4 for producing a focussed light bar 5. The light source 1 is preferably a LED which is processed or treated in such a way that the aperture 4 is arranged directly on the surface thereof. For that purpose, the parallelipipedic light emitting diode is bevelled or chamfered to an angle of 45° to permit light to issue at the side. The slit-type aperture which consists of a coated glass plate is arranged laterally on the LED in such a way that the slit is disposed in the region of the rays which are deflected by the chamfered part of the LED. Finally, the surface of the LED is provided by vapour deposition with a reflecting aluminium layer which does not transmit light.

The light beam 5 is projected on to a photosensitive receiving means 6. A transparent scale 3 is displaceable in the direction indicated by the arrow A, between the light source 1 or the aperture 4 and the receiving means 6. It will be appreciated that it would also be theoretically possible for the scale 3 to be arranged in a fixed position, with the other specified components for the length measuring system to be arranged displaceably. A line grid consisting of the individual graduation lines 2 is disposed on the scale 3 in per se known manner. The scale is not transparent at the graduation lines 2.

Figure 3:
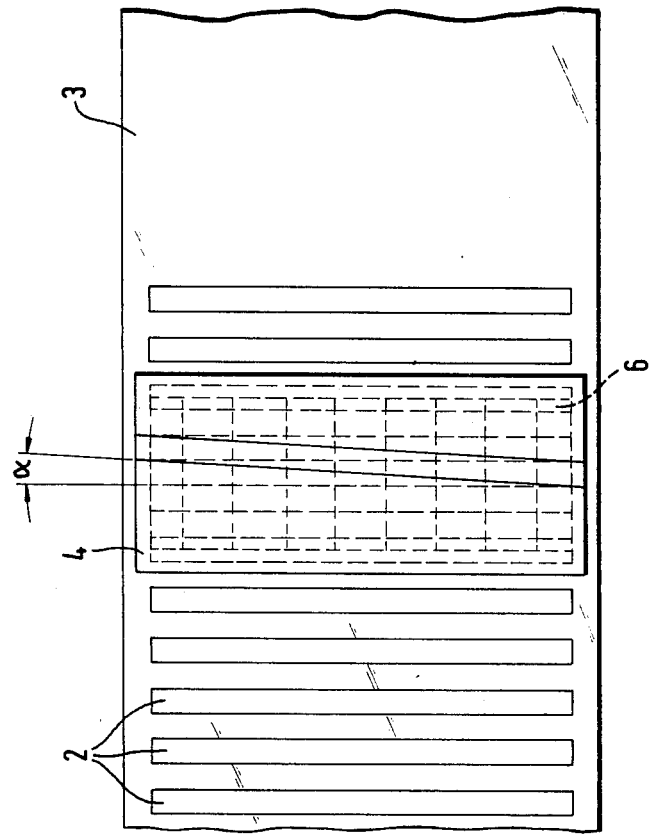
FIG. 3 is a veiw on to a scale, as veiwed from a light source.

As can be seen in particular also from FIG. 3, the aperture 4 is so arranged that the ligth bar which impinges on the scale 3 is inclined with respect to the graduation lines 2 at a given angle alpha. In the event of displacement of the scale 3, that arrangement gives a configuration of the light beam which is projected on to the receiving means 6, that varies in the longitudinal direction of a graduation line, as shown in FIG. 1 by the directional arrow B. FIG. 1 shows the way in which the graduation line 2' masks a portion of the inclined light beam 5 so that a shadow 21 is thrown on to the receiving means 6. For the purposes of signal formation at the receiving means, only the remaining light beam 5' is used; in the case of the illustrated relative position, the light beam 5' is in the shape of a triangle, the width of which decreases towards the lower edge of the receiving means.

FIG. 4 shows the variation in the configuration and position of a light beam 5 at the receiving means 6 upon displacement of the scale by a quarter of an increment in each case. In that arrangement, the receiving means 6 is in the form of a pin photodiode array with seven superposed diodes 7. FIG. 4a shows a notional zero position in which primarily the middle diode $7_4$ is illuminated while the diodes which are disposed above and below that diode only receive steadily tapering light bars.

When the scale is displaced in the direction indicated by the arrow by a quarter of a division, the position and the configuration of the light beam 5 alter in such a way that it is predominantly the upper diodes $7_5$, $7_6$ and $7_7$ which are illuminated, as can be seen from FIG. 4b.

In FIG. 4c which shows a further advance movement of the scale by a quarter of a graduation, the middle diode $7_4$ is virtually no longer illuminated. Instead, the lower diodes $7_1$ to $7_3$ on the one hand and the upper diodes $7_5$ to $7_7$ on the other hand are substantially uniformly illuminated.

In the event of displacement of the scale as shown in FIG. 4d, by a total of three quarters of a division, the emphasis of the illumination is on the lower diodes $7_1$ to $7_3$. In the event of further advance movement of the scale by a quarter, that again gives the illumination picture shown in FIG. 4a. The graduation line 2' is illustrated in order clearly to show the relative displacement as between the scale and the receiving means. It will be seen that any desired portion within a travel increment gives a progressively varying illumination of the photodiodes. The level of resolution which can technically still be achieved depends on the number of individual diodes employed as well as the length of the graduation lines and the light bar.

The signals produced by the illuminated diodes can be used directly for providing measurement values by means of an IC, without complicated conversion. The entire measuring travel is ascertained by counting off the passages or openings which pass through entirely. Depending on the sequence in which the diodes are illuminated, it is also possible to arrive at a conclusion regarding the direction of movement of the scale. The signals produced may be evaluated directly with a commercially available computer. The electronic system may in principle be used for scales of any length so that the scale can simply be increased in length on measuring machines, without adaptation of the electronic system.

FIGS. 5 and 6 show an apparatus according to the invention in a measuring sensor 8 of a measuring machine. The views shown are enlarged by about 2.8 times in comparison with the original size. The function of a measuring sensor in a one- or multi-dimensional measuring machine is known to the man skilled in the art and is therefore not described in greater detail herein.

The measuring sensor 8 essentially comprises a casing tube 12 which is closed at one end with a cable terminal box or sleeve 13 and at the other end with an abutment sleeve 14. Arranged within the tube 12 is a high-precision guide sleeve 10 in which a scale carrier 9 is axially displaceably mounted.

The items indicated at 9 and 10 comprise super-hard materials such as for example SiC, $Si_3N_4$, $ZrO_2$, $Al_2O_3$, Sialon, TiC, Aln, ZrN, $C_4BN$, of a polycrystalline or monocrystalline structure. The scale carrier 9 is screwed to a sensing pin or stylus carrier 15 into which can be screwed a sensing pin or stylus provided for example with a ball. To secure it against rotation, the carrier 15 is provided with a guide groove 22 into which engages a guide pin 16 on the abutment sleeve 14. A compression spring 19 between the spring abutment ring 17 and the abutment sleeve 14 ensures that the unloaded carrier 15 or the scale carrier 19 is always held in an end position. To provide protection against fouling, a rubber bellows 20 is arranged between the spring abutment ring 17 and the abutment sleeve 14.

The scale 3 is secured to the scale carrier 9 in such a way that the light source can project focussed light through the scale 3 on to the receiving means 6. The receiving means 6 is arranged on the measuring head 11 which at the same time also serves as a support for the scale carrier 9. The light source 1 with the aperture disposed thereon is held in the measuring head 11 in such a way that the scale 3 slides directly along the aperture. That prevents stray light from impinging thereon. In addition, an emulsion for producing contact between the aperture and the surface of the scale may be applied on the surface of the scale. In order to provide for a certain degree of biasing of the light source relative to the surface of the scale, a foam member 23 which has resilient properties may be clamped for example between the guide sleeve 10 and the light source 1. The guide sleeve 10 is sealed relative to the cable terminal box 13 by means of a sealing ring 18.

The illustrated embodiment clearly shows the extremely simple and compact structure of the apparatus according to the ivention. The entire electronic system required for the measuring operation is integrated into the sensor 8. It will be appreciated that the measuring apparatus according to the invention may also be used in other installations, for example, for roundness testing equipment, strain measurement or extension measurement equipment, inclinometers, etc. The apparatus according to the invention is also not limited to measuring linear measuring sections. It is also possible to measure angles in precisely the same fashion. For that purpose, for the purposes of measuring a rotational movement, the linear scale 3 only needs to be replaced by a circular scale on which the same grid is arranged.

I claim:

1. Apparatus for incremental length measurement comprising a light emitting diode, a member formed with a slot constituting an aperture for directing from said diode a focussed light beam having an elongated cross section corresponding to the shape of said slot, said member being mounted with said aperture directly on said diode, a transparent scale engaging said member and bearing regular comparatively opaque graduation lines arranged in series along said scale, means for effecting relative sliding movement between said engaged diode and scale whereby said scale transverses said aperture so that said beam encounters said graduation lines in succession, said aperture being located in an angularly displaced relationship with said graduation lines whereby said light beam is inclined relative to said graduation lines, and photosensitive receiving means comprising a column of receiving units located to receive said beam after passing through said scale and with said column extending substantially parallel to said graduation lines, said angularly displaced relationship being such that said beam of light moves, during said relative movement, transversely of and periodically along said column of receiving units to activate said receiving units selectively for signal formation depending on the position of said scale relative to said aperture.

2. Apparatus according to claim 1 in which said receiving units are photo diodes.

3. Apparatus according to claim 1 in which said receiving units are image sensors.

4. Apparatus according to claim 1 in which said member formed with said aperture and said photosensitive receiving means are mounted to remain stationary in a housing during the measurement operation of the apparatus and said scale is mounted for sliding movement within said housing relative to said aperture.

5. Apparatus according to claim 4 in which said emitting diode is chamfered at an angle of 45° to permit light rays to issue at the side, and said member with said slot is arranged in the region of the light rays which are deflected by the chamfered part and in which the surface of the light emission diode is provided with a reflecting aluminum layer.

6. Apparatus according to claim 4 in which the said housing is substantially cylindrical and contains a piston-like member being movable within said housing and carrying the scale on a scale carrier.

7. Apparatus according to claim 6 in which said housing and said piston-like member are made of a superhard material.

8. Appartus according to claim 6 in which the receiving means is arranged on a measuring head on the opposite side of the light emission diode, said measuring head forming a support for the scale carrier.

9. Apparatus according to claim 8 in which the light emitting diode is pressed against the scale by spring means.

* * * * *